Feb. 7, 1939.  C. C. TIEDMAN  2,146,692
APPARATUS FOR STRAINING LIQUIDS
Filed June 9, 1938  3 Sheets-Sheet 1
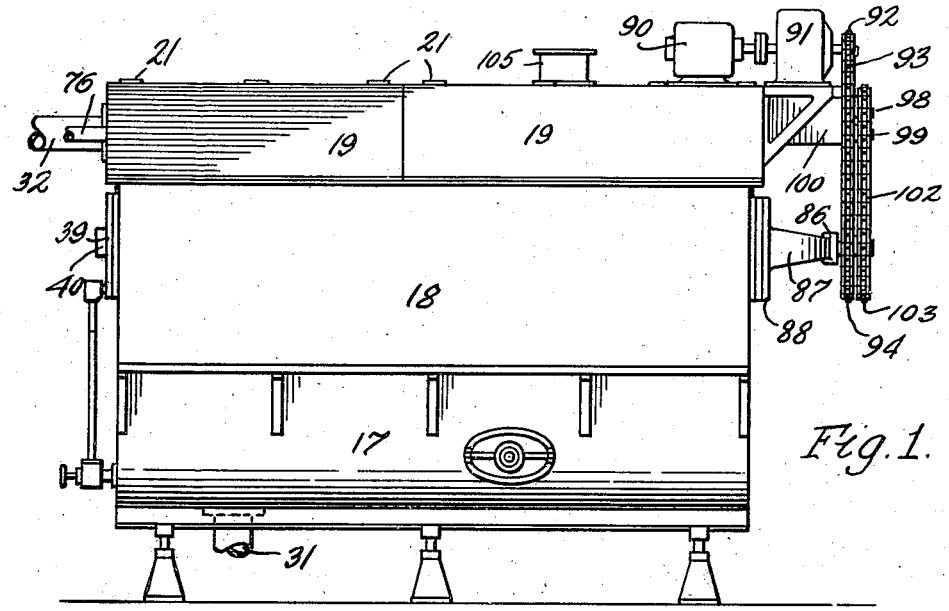
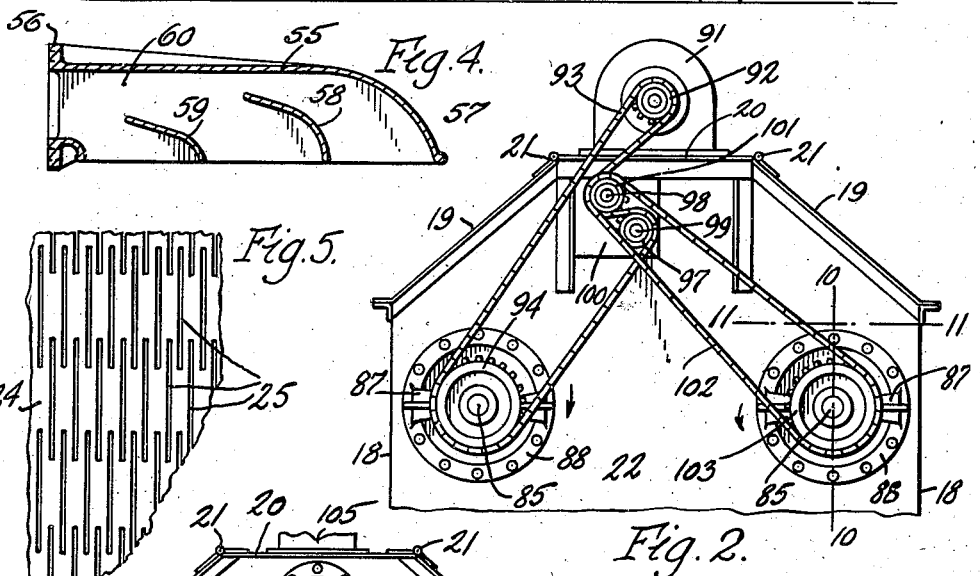
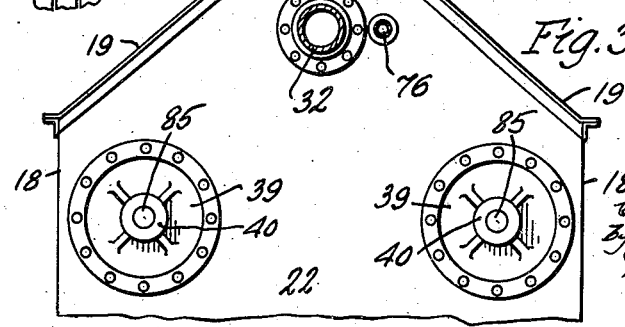
INVENTOR.
Clarence C. Tiedman
by Parker, Prochnow & Farmer
ATTORNEYS.

Feb. 7, 1939. C. C. TIEDMAN 2,146,692
APPARATUS FOR STRAINING LIQUIDS
Filed June 9, 1938 3 Sheets-Sheet 2
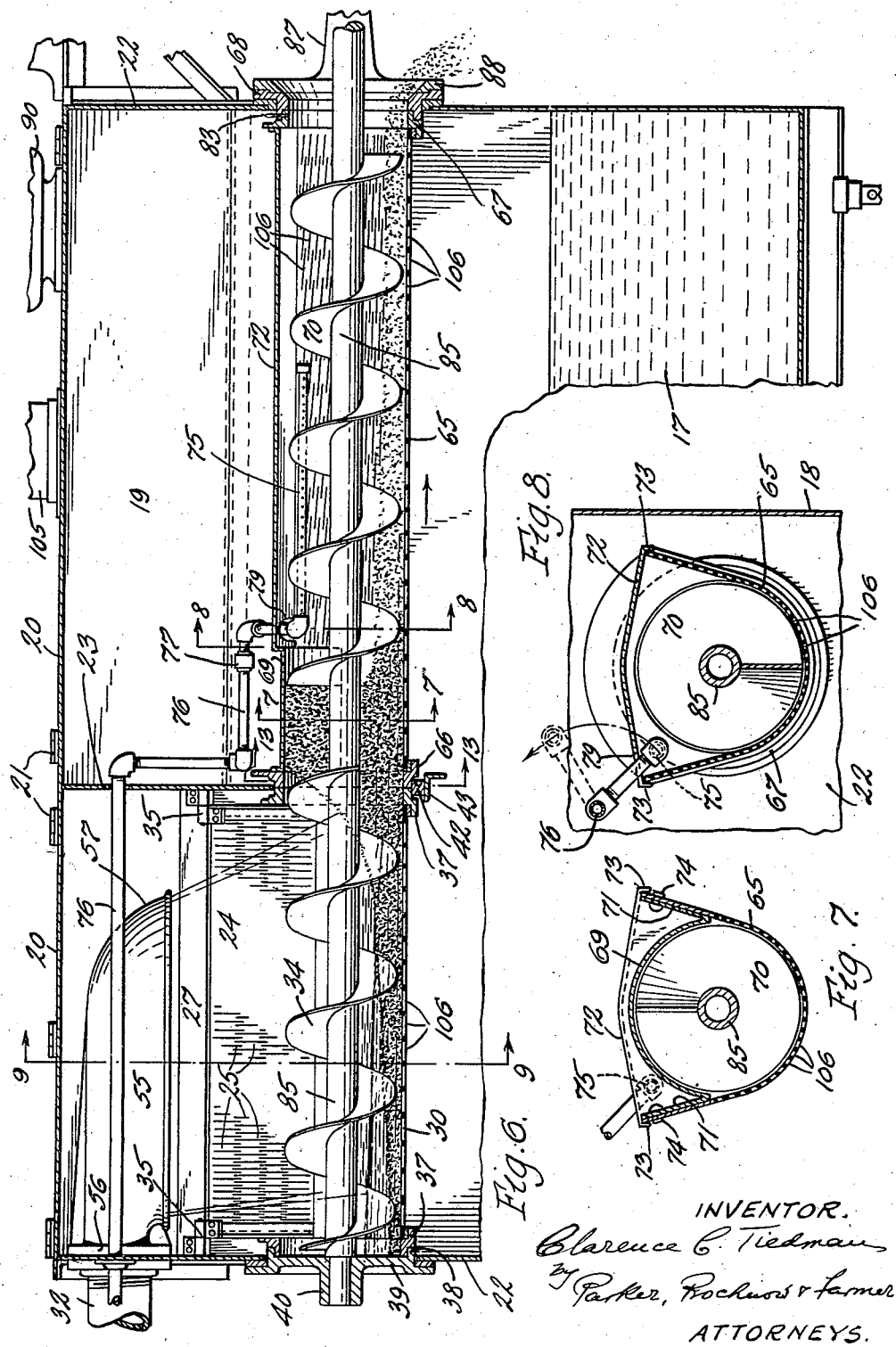
INVENTOR.
Clarence C. Tiedman
by Parker, Rockwood & Farmer
ATTORNEYS.

Feb. 7, 1939.  C. C. TIEDMAN  2,146,692
APPARATUS FOR STRAINING LIQUIDS
Filed June 9, 1938  3 Sheets-Sheet 3
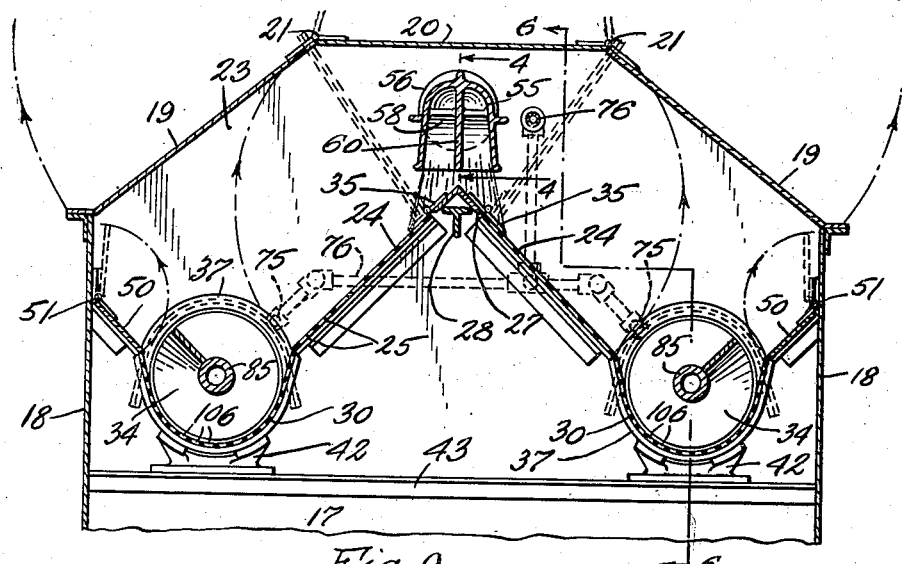
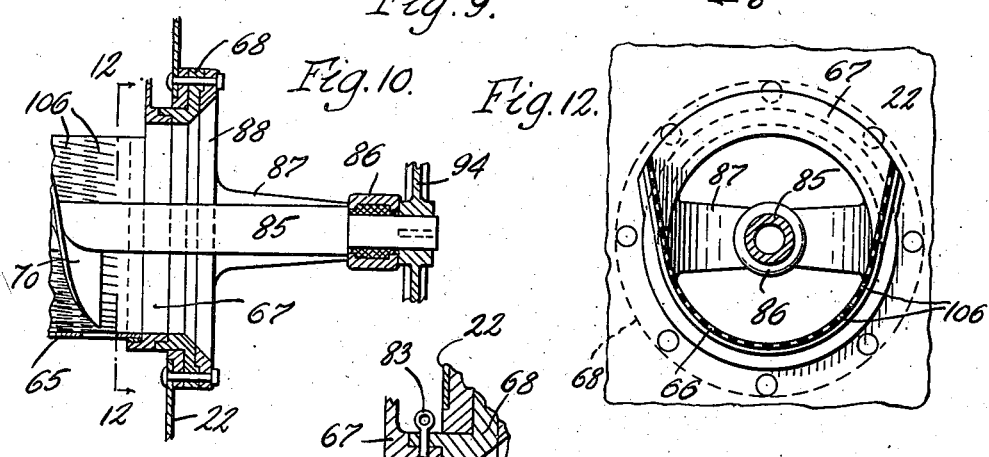
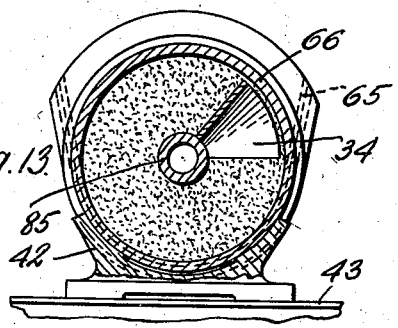
INVENTOR.
Clarence C. Tiedman
By Parker, Prochnow & Farmer
ATTORNEYS.

Patented Feb. 7, 1939

2,146,692

UNITED STATES PATENT OFFICE 2,146,692

APPARATUS FOR STRAINING LIQUIDS

Clarence C. Tiedman, Buffalo, N. Y., assignor to The Wittemann Company, Inc., Buffalo, N. Y.

Application June 9, 1938, Serial No. 212,801

20 Claims. (Cl. 210—149)

This invention relates to improvements in apparatus for straining liquids, such for example as are commonly employed in breweries for straining wort to remove the hops therefrom.

One of the objects of this invention is to provide a straining apparatus of improved and simplified construction and of large capacity by means of which solid or semi-solid material is continuously removed out of contact with the liquid during the straining operation. Another object of this invention is to provide a straining apparatus of this kind in which the liquid which is being strained serves to keep the straner plates or surfaces clear of the material which is being strained out of the liquid, thus eliminating the use of mechanical means or scrapers for removing the solid or semi-solid material from the strainer plates. Another object of this invention is to provide a straining apparatus of improved construction in which the various parts contacting with the liquid can readily be cleaned and sterilized. A further object is to provide an apparatus of this kind in which various parts thereof may be thoroughly cleaned and sterilized without removal of the same from the apparatus. It is also an object of this invention to provide improved means for conveying the solid or semi-solid material out of the apparatus and to wash or sparge the same to remove liquid adhering thereto. Another object of this invention is to provide means of improved construction whereby the material removed from the liquid is subjected to slight pressure to remove liquid therefrom.

A further object is to provide an apparatus of this kind with a spout of improved construction through which the liquid to be strained is discharged to the strainer plates of the apparatus.

Other objects of this invention will appear from the following description and claims.

In the accompanying drawings:

Fig. 1 is a side elevation of a straining apparatus embodying this invention.

Fig. 2 is a fragmentary end view thereof, showing the upper portion of the end of the apparatus at the right in Fig. 1.

Fig. 3 is a fragmentary end view of the upper portion of the opposite end of the apparatus.

Fig. 4 is a longitudinal section of the spout used for discharging liquid to the strainer plates of the apparatus, the section being taken on line 4—4, Fig. 9.

Fig. 5 is a fragmentary face view, on a larger scale, of a portion of a strainer plate.

Fig. 6 is a fragmentary longitudinal central sectional elevation of the apparatus, on an enlarged scale.

Figs. 7 and 8 are fragmentary transverse sectional views of the conveyor of the apparatus taken respectively on lines 7—7 and 8—8, Fig. 6.

Fig. 9 is a fragmentary transverse sectional view of the apparatus on line 9—9, Fig. 6.

Fig. 10 is a fragmentary sectional elevation on an enlarged scale on line 10—10, Fig. 2, showing the discharge end of the trough conducting the separated material from the apparatus.

Fig. 11 is a fragmentary sectional plan view taken on line 11—11, Fig. 2, also showing the discharge end of the trough shown in Fig. 10.

Fig. 12 is a fragmentary transverse sectional view thereof, on line 12—12, Fig. 10.

Fig. 13 is a fragmentary transverse sectional view of the straining apparatus on line 13—13, Fig. 6.

Fig. 14 is a fragmentary longitudinal sectional view showing a locking pin for holding a conveyor trough in the desired position.

In the particular embodiment of the invention which is shown in the accompanying drawings, the straining apparatus includes a housing, which may be of any suitable or desired form, that shown including a lower portion 17 which is of approximately semi-cylindrical shape and forms a container for the liquid which has been strained. The housing also has upright sides 18 extending upwardly from the lower part 17 of the housing. The upper part of the housing is closed by means of one or more cover plates 19, two on each side being employed in the construction illustrated, and these cover plates are mounted so as to permit access to the interior of the housing. In the particular construction shown for this purpose, the cover plates 19 incline downwardly toward the upper edges of the sides 18 and are provided at their upper edges with hinges 21 by means of which the cover plates are connected to a top wall 20 of the housing. Any other means for rendering the interior of the housing readily accessible may, of course, be employed, if desired. The housing also includes end walls 22 secured to the lower portion 17, the upright walls 18 and the top wall 20 of the housing, and a transverse partition 23 is arranged intermediate of the two end walls in the upper portion of the housing and is secured to the side walls 18 and the top wall 20.

At one end of the housing, I provide a pair of oppositely inclined strainer plates 24 which may be of any suitable or usual construction, those illustrated, see Figs. 5 and 6, having a plurality of elongated slots 25 extending transversely of the length of the plates. The strainer plates 24 are preferably connected at their upper edges to a ridge plate or member 27, which in turn may be supported by means of a structural beam, such for example as a T beam 28 shown in Fig. 9, and which extends from an end wall 22 to the partition 23. The wort or other liquid to be strained is discharged to the upper ends of the strainer plates 24 and flows downwardly along the upper faces of the inclined plates, most of the clear liquid passing through the slots 25 in the plates, and the hops or other material to be removed from the liquid passing downwardly over the upper surface of the plates. Because of the relatively steep inclination of the strainer plates 24 or because of the rapid flow of liquid over these plates, or for both of these reasons, the liquid itself prevents the hops or other material from collecting on the upper surfaces of the strainer plates and washes the same to the lower ends of these plates where they are discharged into perforate troughs 30. The liquid which passes through the perforations in the strainer plates or through the perforations in the troughs drops into the lower part of the housing from which it may be discharged in any suitable manner, for example, through a discharge pipe 31, Fig. 1. 32 represents the inlet pipe through which the liquid to be strained enters the housing.

Any suitable means may be employed for continuously removing from the troughs the material collecting therein, and in the construction shown for this purpose, a screw conveyor 34 may be provided in each trough, the conveyor discharging the material beyond the partition wall 23 and out of contact with the liquid which is being strained.

When a straining apparatus of this kind is employed in breweries for straining hops from the wort, it is, of course, very essential that any part of the apparatus which may contact with the wort must be capable of being thoroughly cleansed and sterilized. In order to facilitate the cleansing of my improved straining apparatus, I have provided means whereby both faces of each strainer plate 24 and of each trough 30 may be readily accessible through the openings in the housing which are closed by the cover plates 19. In my improved construction, I preferably accomplish this without removing the strainer plates from the housing. I have, consequently, provided means whereby the strainer plates can be swung about suitable pivots or hinges into positions in which the underfaces of the strainer plates are rendered accessible, and in the construction illustrated for this purpose, I provide each strainer plate with a pair of hinges 35 which connect the ridge member 27 with the upper edge of a strainer plate. Because of this construction, each strainer plate may be swung in the direction indicated by the arrows into the dotted line position shown in Fig. 9, and any suitable holding means, such as hooks, latches, or the like (not shown) may be provided for releasably holding these strainer plates in these inclined positions. When the strainer plates are in the lowered positions, as shown in full lines in Fig. 9, the upper faces thereof can readily be cleaned. If the strainer plates are then swung into their upper positions shown in dotted lines in Fig. 9, the undersurfaces of these plates are rendered equally accessible and can be cleaned equally as thoroughly as the upper faces. Furthermore, when the strainer plates are in their upper positions, they afford easy access to the portions of the interior of the housing which are normally below the strainer plates.

I also provide means for inverting the troughs 30 so that the same may be thoroughly cleaned without removing the same from the straining apparatus. For this purpose, each trough which is of approximately semi-cylindrical form has a ring or annular member 37 secured to each end thereof. The two rings of each trough are arranged to cooperate with suitable fixed bearing members so that each trough may be readily turned about its longitudinal axis from its normal or operative position into an inverted position, and back again into operative position. For example, at the left hand end of the apparatus, as shown in Figs. 1 and 6, the bearing ring 37 has a flange which engages with a flange 38 of a stationary bearing member 39 suitably secured to the end wall 22 of the housing. This bearing member 39 also has a bearing hub 40 in which the shaft of the conveyor 34 is journalled. The ring 37 at the other end of the conveyor trough 30 bears on a suitable bearing member or pedestal 42 mounted on an angle bar or frame member 43 of the housing and arranged at the lower end of the partition 23, see Figs. 6 and 9.

In view of the foregoing description, it will be obvious that after the conveyor troughs 30 have been washed and cleaned while in their operative positions, the conveyor troughs can be inverted by swinging the same about the axes of the rings 37 and when in inverted position, as shown in broken lines in Fig. 9, the lower faces of the conveyor troughs will be accessible for cleaning. Any other means for permitting the conveyor troughs to be inverted may, of course, be provided, if desired. By means of the construction described, the conveyor troughs do not in any way interfere with the conveyor screws 34, since the troughs swing back and forth between their operative and inoperative positions about the conveyors 34.

Preferably suitable splash plates or guards 50 are provided at the outer edges of the conveyor troughs, opposite to those at which the drain plates 24 terminate. These splash plates prevent any unstrained liquid or solid or semi-solid material in the troughs from passing into the lower portion of the housing and also prevent the conveyor troughs from overflowing, in case any large excess of liquid is supplied to the straining apparatus. Preferably, the splash guards or plates 50 are also mounted to facilitate the cleaning of the same, and for this purpose, these plates may, for example, be pivotally mounted on the upright walls 18 of the housing by means of hinges 51. This permits the splash plates to swing from the full line positions indicated on Fig. 9 to the dotted line positions, and the splash plates may be held in the latter positions by any suitable hooks or other means (not shown). When in the upright position shown in dotted lines, the underfaces of the splash plates can be thoroughly cleaned as well as the portion of the interior of the housing adjacent thereto. It will, of course, be obvious that by moving the strainer plates and the splash guards or plates into their upper or inoperative positions, substantially the entire interior of the housing below these parts is rendered accessible for cleaning through the openings normally closed by the cover plates. A further function of the strainer plates and the splash plates is that when the same are lowered into the positions shown in full lines in Fig. 9, they rest upon the upper opposite edges of the troughs 40 and thus serve to hold the troughs in their operative positions and prevent turning of the same when the screw conveyors 34 are turned.

The liquid may be discharged to the strainer plates in any suitable or desired manner to distribute the liquid as uniformly over the plates as possible. In the construction shown for this purpose, I have provided a discharge nozzle of improved construction which includes a shell 55 provided at one end with an annular flange 56, by means of which the nozzle may be secured to the end wall 22 or to the inlet pipe 32. The lower portion of the shell 55 of the nozzle is preferably entirely open and the shell extends around the end of the nozzle, as indicated at 57, to deflect liquid at the end of the nozzle downwardly toward the strainer plates. In order to provide for a substantially uniform distribution of the liquid lengthwise of the strainer plates, a pair of vanes 58 and 59 is also provided within the shell 55 of the nozzle which serve to direct other portions of the liquid flowing lengthwise of the shell 55 downwardly to different portions lengthwise of the strainer plates. When two strainer plates are used so that the discharge of the nozzle should be divided equally between the two plates, the nozzle preferably is also provided with an upright central dividing wall or partition 60. Consequently, by means of this nozzle, a relatively large stream of liquid may be discharged at high velocity to the strainer plates and the liquid will be deflected by the nozzle in such a manner as to flow in substantially uniform volume over all portions of the strainer plates. Any other means for delivering the liquid to be strained to the strainer plates may, of course, be used.

In the apparatus shown, two strainer plates are used which are inclined in opposite directions from the ridge piece 27, but it will be obvious that, if desired, only a single strainer plate need be employed, since the apparatus as shown, of course, is duplicated on opposite sides of a central vertical plane passing through the middle of the apparatus.

It is frequently desirable to recover as much as possible of the liquid from the material which has been removed from the liquid by the straining apparatus. If, for example, the apparatus is used for removing hops from wort, very considerable quantities of wort will adhere to the hops and it is, of course, desirable that this wort be saved. For this purpose, I provide at the discharge end of the screw conveyors 34 means for gently pressing the hops or other material to remove wort therefrom without also removing from the hops certain substances which would cause an objectionably bitter taste in the beer. In addition to gently pressing the wort out of the hops, it is also generally desirable to rinse or sparge the hops or other material to further remove liquid therefrom.

In the particular construction shown for this purpose, I provide a second conveyor trough 65 for each conveyor trough 30. Each trough 65 may be similar to the conveyor trough 30 of which it forms a continuation and may extend from the partition 23 approximately to the end wall 22 at the discharge end of the apparatus. This conveyor trough may, of course, be formed in one piece with the conveyor trough 30, but for convenience I form the trough 65 separately from the trough 30. This trough 65 is also provided at its ends with annular bearing members 66 and 67 rigidly secured thereto, one of which bears on the bearing pedestal 42, and the other of which bears in an annular fixed bearing member 68 suitably secured to the end wall 22. These bearing members permit the trough 65 to be inverted for cleaning as described in connection with the trough 30.

In order to provide a substantially cylindrical compressing or squeezing chamber for the material discharged from the trough 30, I provide a cover for the trough 65, a portion 69 of which is of such shape as to form with the trough 65 a substantially cylindrical compressing or squeezing chamber, into one end of which a screw conveyor 70 extends, which may, if desired, be secured on the same shaft as the conveyor screw 34. This portion of the cover may be secured to the trough 65 in any suitable manner, for example, by means of flanges 71, Fig. 7, and if desired, bolts or pins 74 may extend through suitable holes in the flanges 71 of the cover and the upper portion of the conveyor trough for holding the cylindrical portion 69 of the cover in correct relation to the conveyor trough 65. Preferably the cover has another portion which extends over the remainder of the conveyor trough 65. This portion 72 of the cover is spaced at a greater distance above the conveyor 70 and may be held in place on the conveyor trough in any suitable manner, for example, by means of downwardly extending flanges 73 on the cover extending over the upper edges of the conveyor trough 65.

As a result of this construction, it will readily be seen that the material discharged from the conveyor 34 into the cylindrical portion or squeezing chamber of the conveyor trough 65 enclosed by the part 69 of the cover will gradually accumulate until a considerable mass of this material has been piled up and packed together in this chamber. The crowding or squeezing of the material into this chamber by means of the screw conveyor 34 results in a squeezing of liquid out of the material. This liquid passes through the perforations in the conveyor trough 65 into the bottom of the housing. As the mass of material collects in the squeezing chamber, the pressure on this mass by the conveyor screw will gradually push the mass into position to be engaged by the receiving end of the screw conveyor 70, by means of which it will be fed along the conveyor trough 65.

As the material is being fed along the trough 65, it is preferably subjected to a spray of water or other suitable liquid to remove the wort or other liquor from the material.

In the particular construction shown, each of the two conveyor troughs 65 is provided with a sparge or spray pipe 75 of any suitable construction, by means of which a spray of water is directed at the hops or other material leaving the cylindrical portion or squeezing chamber, and this water together with liquid removed from the hops drains through the perforations in the trough into the lower portion of the housing of the apparatus. The sparge or spray pipe 75 is connected to a suitable supply pipe 76 leading into the housing of the straining apparatus, and the pipe 76 preferably extends through a suitable hole or recess 79 in the conveyor trough cover, enabling the sparge pipe to be swung out of its operative relation in the trough 65 to permit the trough to be inverted for cleaning. In the construction shown for this purpose, a swivel joint or connection 77 is preferably provided in the pipe 76 by means of which the sparge or spray pipe 75 may be swung from its operative position shown in full lines in Fig. 8 to an inoperative position shown in broken lines. When in its inoperative position, the trough 65 may be swung into an inverted position, as described in connection with the trough 30 to permit thorough cleaning of the trough.

The fixed bearing ring 68 with which the bearing ring 67 of the conveyor trough 65 cooperates is provided with a relatively large opening through which the material strained from the liquid is discharged by the screw conveyor 70 from the trough 65. The ring 67 secured to the conveyor trough 65 may be held in its operative position or in inoperative, inverted position relatively to the fixed bearing 68 in any suitable or desired manner, for example, by means of a pin 83 extending through registering holes in overlapping portions of the rings 67 and 68, see Figs. 6 and 14. Other suitable holding means may, of course, be employed in place of the pin 83 and, if desired, a pin similar to the pin 83 or other suitable holding means may also be provided for holding the trough 30 in the desired position, since such pin can readily be arranged to extend through cooperating holes in the bearing ring 37 and the flange 38.

The two conveyors 34 and 70 are preferably secured on a single shaft 85 which extends from end to end of the apparatus, one end of the shaft being journalled in the bearing hub 40, and the other end of the shaft being journalled in a bearing 86 arranged beyond the opposite end wall of the apparatus on a suitable bracket member 87. The inner end of the bracket member 87 may be in the form of a ring or annular member 88 which may be bolted or otherwise suitably secured to the fixed bearing member 68 for the trough 65, as clearly shown in Figs. 10 to 12 inclusive. Other means for mounting the bearing 86 on the apparatus may, of course, be employed. By means of this construction, the bearing is arranged entirely outside of the apparatus where it is unaffected by the liquid under treatment and also the bearing in no way interferes with the discharge of material from the discharge end of the trough 65.

One of the advantages of my improved apparatus is that because of the rapid rate of flow of liquid over the strainer plates, which may result either from the degree of inclination of the plates or from the velocity of the liquid discharged to the plates, the hops or other material is washed down the strainer plates 24 by the liquid and, consequently, no mechanism for removing the material from the strainer plates is necessary. Consequently, the screw conveyors constitute the only movable parts of the apparatus and as a result, the apparatus requires comparatively little power, and a relatively small motor 90, which may be mounted on the top plate 20 of the apparatus, may be used to drive the conveyor shafts.

Any suitable or desired means for transmitting power from the motor to the conveyor shafts may, of course, be provided, and in the particular construction illustrated, see particularly Figs. 1 and 2, the motor is directly connected to a suitable speed reducing mechanism 91, the driven shaft of which is provided with a sprocket wheel 92 which engages with a sprocket chain 93. This chain meshes with a sprocket gear 94 mounted on one of the two conveyor shafts 85. Since the two screw conveyors are driven in opposite directions, the following construction may, if desired, be employed for driving the other conveyor shaft.

The sprocket chain 93 passes over a pair of idler sprocket wheels, one of which is shown at 97 in Fig. 2, these idler sprocket wheels being mounted on shafts 98 and 99 which may be suitably mounted on the housing of the apparatus, for example, on the bracket 100. One of these idler sprocket wheels is connected with a sprocket wheel 101 on the shaft 98, and it will be noted that this sprocket wheel rotates in a direction opposite to that of the sprocket wheel 92. A sprocket chain 102 connects the sprocket wheel 101 with a sprocket wheel 103 secured on the other conveyor shaft 85. Other means for applying rotary motion to the screw conveyors may, of course, be employed, if desired.

The apparatus may also be provided in the top wall 20 thereof with a ventilating duct 105 through which vapors may be withdrawn from the housing of the apparatus, which is desirable, if for example the apparatus is used in connection with the straining of hot liquids.

It will be noted by reference to Fig. 6, that the slots in the conveyor troughs used in this apparatus are preferably inclined from the horizontal to a limited extent. These slots 106 are preferably arranged to extend in a direction substantially perpendicular to the face of that portion of the conveyor screw which engages the material to advance the same lengthwise of the trough. By means of this arrangement, the slots 106 extend in the normal direction of movement of the material by the conveyor screw, and consequently, there is no tendency on the part of the material to move laterally with reference to the slots. This avoids wear on the longitudinal edges of the slots, and therefore, increases the life of the conveyor trough, and furthermore, facilitates the movement of the material lengthwise of the trough by the screw so that there is less tendency on the part of the conveyor screw to break up or cut the material or force it into or through the slots 106. Perforate troughs of other forms may, of course, be used, if desired.

The apparatus described has the advantage that it is of large capacity due largely to the fact that the removal of material from the strainer plates by means of the liquid results in the keeping of these strainer plates substantially free from the material which is being removed from the liquid, so that the strainer plates may perform at their maximum capacity at all times, since there will be very little, if any, interruptions by the material of the steady flow of liquid through the slots. Furthermore, the perforate conveyor troughs 30 greatly add to the capacity of the apparatus, since a considerable amount of the liquid passes downwardly beyond the lower edges of the strainer plates to carry the material into the troughs, and this liquid passes rapidly through the slots 106 or other perforations in the troughs.

By eliminating the use of scrapers for removing the material from the strainer plates, the life of the apparatus is materially increased by eliminating the resulting wear on the strainer plates and on the scrapers, and furthermore, the power necessary to drive such scrapers is eliminated in the apparatus shown. A further advantage resulting from the elimination of scrapers is that when the apparatus is used for separating hops from wort, the hops are gently removed from strainer plates so that no mechanical pressure, breaking, or abrading action on the hops results, as would be the case if mechanical scrapers were employed. This avoids removal from the hops of certain ingredients which would tend to produce an objectionable taste in beer.

Furthermore, the construction described results in an apparatus which can be readily and easily cleaned so that the same may be maintained in a highly sanitary condition. This cleaning can be accomplished without the necessity of removing any of the parts of the apparatus from the housing. The strainer plates, troughs and splash plates are, furthermore, so arranged that when they are moved into their inoperative positions for cleaning, they render other parts of the apparatus accessible so that they serve the dual purpose of exposing all of their own faces to cleaning and also rendering other parts of the apparatus accessible for cleaning.

The fact that the apparatus is greatly simplified and requires less mechanism and less power also makes it possible to produce the apparatus at lower cost, and decreases the expense of maintaining the same in a sanitary condition.

I claim as my invention:

1. In a straining apparatus, the combination of a strainer plate arranged at an inclination, means for discharging liquid on the upper portion of said plate, a perforate trough at the lower edge of said plate and into which material passing over said strainer plate is discharged, and means in said trough for removing said material from the apparatus.

2. In a straining apparatus, the combination of an inclined strainer plate, a nozzle above said strainer plate through which the liquid to be strained is projected over the upper surface of said plate, a perforate trough at the lower end of the plate into which the material remaining on the upper surface of the plate is carried by the liquid, and means for removing the material collected in said trough from the apparatus.

3. In a straining apparatus, the combination of an inclined strainer plate, means for discharging liquid on said plate, a housing in which said plate is arranged, a cover forming a part of said housing and movable into an open position to render said strainer plate accessible, and means for mounting said strainer plate in said housing for movement into a position to render the lower face thereof accessible when said cover plate is in open position.

4. In a straining apparatus, the combination of an inclined strainer plate, means for discharging liquid on said plate, a housing in which said plate is arranged, a cover forming a part of said housing and movable into an open position to render said strainer plate accessible, and pivot means connecting the upper portion of said strainer plate with a fixed part of said apparatus to permit said strainer plate to be swung into a position in which the lower face of said strainer plate is accessible for cleaning.

5. In a straining apparatus, the combination of a perforate strainer plate arranged at an inclination, means for discharging liquid to be strained on the upper portion of said plate, a perforate trough at the lower edge of said plate into which liquid and material passing over said strainer plate is discharged, means in said trough for moving material collected in said trough out of said apparatus, and means for moving said trough into a substantially inverted position to render the lower face of said trough accessible for cleaning.

6. In a straining apparatus, the combination of a perforate strainer plate arranged at an inclination, means for discharging liquid to be strained on the upper portion of said plate, a perforate trough at the lower edge of said plate into which liquid and material passing over said strainer plate is discharged, a conveyor screw in said trough for moving material collected in said trough lengthwise of said trough out of said apparatus, and means for mounting said trough to swing about said screw conveyor into an inverted position in which the lower face of said trough is accessible for cleaning.

7. In a straining apparatus, the combination of a perforate strainer plate arranged at an inclination, means for discharging liquid to be strained on the upper portion of said plate, a perforate trough at the lower edge of said plate into which liquid and material passing over said strainer plate is discharged, a conveyor screw in said trough for moving material collected in said trough lengthwise of said trough out of said apparatus, annular members to which the ends of said trough are secured and which extend about the axis of said conveyor screw, and bearings on said apparatus for said annular members whereby said trough may be swung on said bearings and about said conveyor screw into an inverted position to render the lower face thereof accessible for cleaning.

8. In a straining apparatus, the combination of a housing, a cover forming a part of the upper portion of said housing and movable into an open position to render the interior of said housing accessible, a strainer plate arranged at an inclination in said housing, means for discharging liquid on the upper surface of said strainer plate, a perforate trough arranged at the lower end of said plate, means for swinging said strainer plate out of its normal position into a position to render the lower face of said strainer plate accessible for cleaning, and means for inverting said trough in said apparatus to render the lower face thereof accessible for cleaning.

9. In a straining apparatus, the combination of an inclined strainer plate, means for discharging liquid to be strained to the upper portion of said plate, a perforate trough for receiving liquid and material discharged from said strainer plate, the lower portion of said strainer plate resting on an edge of said trough, an inclined splash plate arranged on the side of said trough opposite to said strained plate and having its lower edge resting on the opposite edge of said trough, means for moving said strainer plate and splash plate out of engagement with said trough, means in said trough for removing from said apparatus material collected in said trough, and means for turning said trough about said material removing means to render the lower portion of said trough accessible for cleaning, said strainer plate and said splash plate when resting on said trough holding said trough against movement out of its operative position.

10. In a straining apparatus, the combination of an inclined strainer plate, means for discharging liquid to be strained to the upper portion of said plate, a perforate trough having one edge arranged in position to permit liquid and material discharged from said strainer plate to enter said trough, a splash plate extending at an inclination upwardly from the other edge of said trough, and means for swinging said splash plate out of engagement with said trough to render the lower face of said splash plate accessible for cleaning.

11. In a straining apparatus, the combination of a pair of inclined strainer plates having their upper edges arranged adjacent to each other, means for discharging liquid to be strained to the upper portions of said strainer plates, a pair of perforate troughs, one arranged at the lower edge of each strainer plate, into which troughs liquid and material passing over said strainer plates are discharged, and means for movably mounting said strainer plates to move into positions in which the lower surfaces thereof are accessible for cleaning.

12. In a straining apparatus, the combination of a pair of inclined strainer plates having their upper edges arranged adjacent to each other, means for discharging liquid to be strained to the upper portions of said strainer plates, a pair of perforate troughs, one arranged at the lower edge of each strainer plate, into which troughs liquid and material passing over said strainer plates are discharged, means for movably mounting said strainer plates to move into positions in which the lower surfaces thereof are accessible for cleaning, means for inverting said troughs to render the lower faces thereof accessible for cleaning, and a housing extending below said troughs and strainer plates in which the liquid passing through said strainer plates and perforate troughs collects and which is rendered accessible for cleaning when said strainer plates are moved into positions to expose the undersurfaces thereof for cleaning.

13. In a straining apparatus, the combination of a strainer plate, means at one end of said strainer plate for discharging liquid to be strained across the upper face thereof, a perforate trough into which material passing over said strainer plate collects, a conveyor screw in said trough for discharging the material beyond an end of said strainer plate, a substantially cylindrical compression chamber into one end of which the material collecting in said trough is discharged by said conveyor screw, and a second conveyor screw for removing material from the other end of said compression chamber.

14. In a straining apparatus, the combination of a strainer plate, means at one end of said strainer plate for discharging liquid to be strained across the upper face thereof, a perforate trough into which material passing over said strainer plate collects, a conveyor screw in said trough for discharging the material beyond an end of said strainer plate, a substantially cylindrical compression chamber into one end of which the material collecting in said trough is discharged by said conveyor screw, a second conveyor screw for removing material from the other end of said compression chamber, and means for spraying the material withdrawn from said compression chamber by said second conveyor screw to remove liquid adhering thereto.

15. In a wort strainer, the combination of a strainer plate over which the wort is passed to remove hops therefrom, a screw conveyor including a perforate trough in which the material discharged from said strainer plate is collected, a compression chamber into which hops are fed by said screw conveyor, a second screw conveyor arranged beyond said compression chamber and which removes the hops from said compression chamber, and a sparge pipe for discharging water into said second screw conveyor to remove wort adhering to said hops.

16. In a wort straining apparatus, the combination of a strainer plate over which wort containing hops flows, a perforate trough into which hops and wort are discharged from said strainer plate, and which extends beyond one end of said strainer plate, a conveyor screw in said trough for moving hops beyond said end of said strainer plate, a second conveyor screw in the portion of said trough extending beyond said end of said strainer plate and spaced at a distance beyond said first conveyor screw, a cover for the portion of said trough extending beyond said strainer plate, a portion of said cover forming a portion of said trough between said conveyor screws a substantially cylindrical compression chamber into which hops are fed by said first conveyor screw, and from which hops are removed by said second conveyor screw, and means for sparging the hops while being conveyed by said second conveyor screw, to remove wort adhering to said hops.

17. In a wort straining apparatus, the combination of means for removing hops from the wort, including a trough and a conveyor screw operating therein, a removable cover for a portion of said trough, a sparge pipe extending through said cover into position for sparging hops passing along said trough, and means for inverting said trough about said conveyor screw for rendering the lower surface of said trough accessible for cleaning.

18. In a wort straining apparatus, the combination of means for removing hops from the wort, including a trough and a conveyor screw operating therein, a removable cover for a portion of said trough, a sparge pipe extending through said cover and into said trough for sparging hops passing along said trough, means for inverting said trough about said conveyor screw for rendering the lower surface of said trough accessible for cleaning, and means for swinging said sparge pipe out of its operative position within said conveyor trough when said cover is removed, to permit inverting of said trough.

19. In a straining apparatus, the combination of a strainer plate, a nozzle arranged above one edge of said strainer plate for projecting liquid across said plate and having a discharge opening in the lower face thereof, and a plurality of vanes in said nozzle arranged at intervals lengthwise of said plate and successively extending into said nozzle to greater distances from said discharge opening, to deflect different portions of the liquid in said nozzle to different portions of said strainer plate.

20. In a straining apparatus, the combination of a pair of inclined strainer plates arranged with their upper edges adjacent to each other, a nozzle arranged lengthwise over said adjacent edges of said strainer plates and having a discharge opening in the lower face thereof, a longitudinally extending partition in the middle portion of said nozzle for dividing the liquid in said nozzle for equal distribution to both of said strainer plates, and vanes extending into said nozzle to different distances from said discharge opening of said nozzle for deflecting liquid to different portions of said plates.

CLARENCE C. TIEDMAN.